United States Patent [19]

Cheng-Chung

[11] Patent Number: 5,178,523
[45] Date of Patent: Jan. 12, 1993

[54] AUXILIARY PACKAGE FOR A BATH-POOL
[75] Inventor: Wang Cheng-Chung, Taipei, Taiwan
[73] Assignee: Team Worldwide Corporation, Taipei, Taiwan
[21] Appl. No.: 405,132
[22] Filed: Sep. 11, 1989
[51] Int. Cl.⁵ ............................................. F04B 35/04
[52] U.S. Cl. .................... 417/423.3; 417/366; 417/423.8; 417/423.13; 417/423.14; 415/168.2; 4/544
[58] Field of Search ................... 4/541, 544; 415/52.1, 415/58.4, 110.1, 171.1, 168.2; 417/366, 372, 309, 311, 423.3, 423.8, 423.12, 423.13, 423.14, 423.9

[56] References Cited

U.S. PATENT DOCUMENTS

| | | | |
|---|---|---|---|
| 2,667,127 | 1/1954 | Rimann | 417/423.8 |
| 2,948,222 | 8/1960 | Pine | 417/311 |
| 3,179,058 | 4/1965 | Meagher | 417/423.8 |
| 3,195,035 | 7/1965 | Sudmeier | 417/372 |
| 3,286,712 | 11/1966 | Roden | 4/544 |
| 3,736,075 | 5/1973 | Otto | 417/423.9 |
| 4,716,605 | 1/1988 | Shepherd et al. | 4/544 |
| 4,806,080 | 2/1989 | Mizobuchi et al. | 417/423.12 |
| 4,942,630 | 7/1990 | Kantor et al. | 4/541 |
| 4,947,494 | 8/1990 | Moreland | 4/544 |
| 4,985,941 | 1/1991 | Pommerning | 4/544 |

FOREIGN PATENT DOCUMENTS

3635329   4/1988   Fed. Rep. of Germany ........... 4/541

Primary Examiner—Richard A. Bertsch
Assistant Examiner—Michael I. Kocharov
Attorney, Agent, or Firm—Silverman, Cass & Singer, Ltd.

[57] ABSTRACT

An auxiliary package for a bath-pool, particularly for a sauna bath-pool, comprising a housing having a water inlet for receiving water from the bath-pool, a water exit for sending the water back to the bath-pool and a plurality of partition walls for dividing the interior of the housing into a plurality of chambers and forming a water passage therein, a water pump mounted in one of the chambers for sucking the water from the inlet and circulating the water through the passage to the bath-pool, an electric motor mounted in one of the chambers for driving the water pump capable of transfering the heat generated to the water flowing in the passage, a control box for controlling the electric motor, which is mounted watertight on the housing, and electric plug means adapted for connection to a power system for receiving electrical power. As the water pump, the motor and the filter of the package are all mounted in a housing, the auxiliary package of the present invention can be made more compact than prior known auxiliary packages for sauna bath-pools. Another advantage of the auxiliary package of the present invention is that the heat generated by the motor can be used to preheat the water from the sauna bath-pool to save energy. Furthermore, the water pump, motor and filter are provided with sealing covers so as to make them watertight, and each sealing cover also is provided with a microswitch to cut off the power when any of the sealing covers is opened.

19 Claims, 12 Drawing Sheets

AUXILIARY PACKAGE FOR A BATH-POOL

BACKGROUND OF THE INVENTION

The present invention relates to an auxiliary package for a bath-pool, and particularly to an improved auxiliary package used for a sauna bath-pool which is capable of circulating, heating and filtering the water of the bath-pool.

Figure 10:
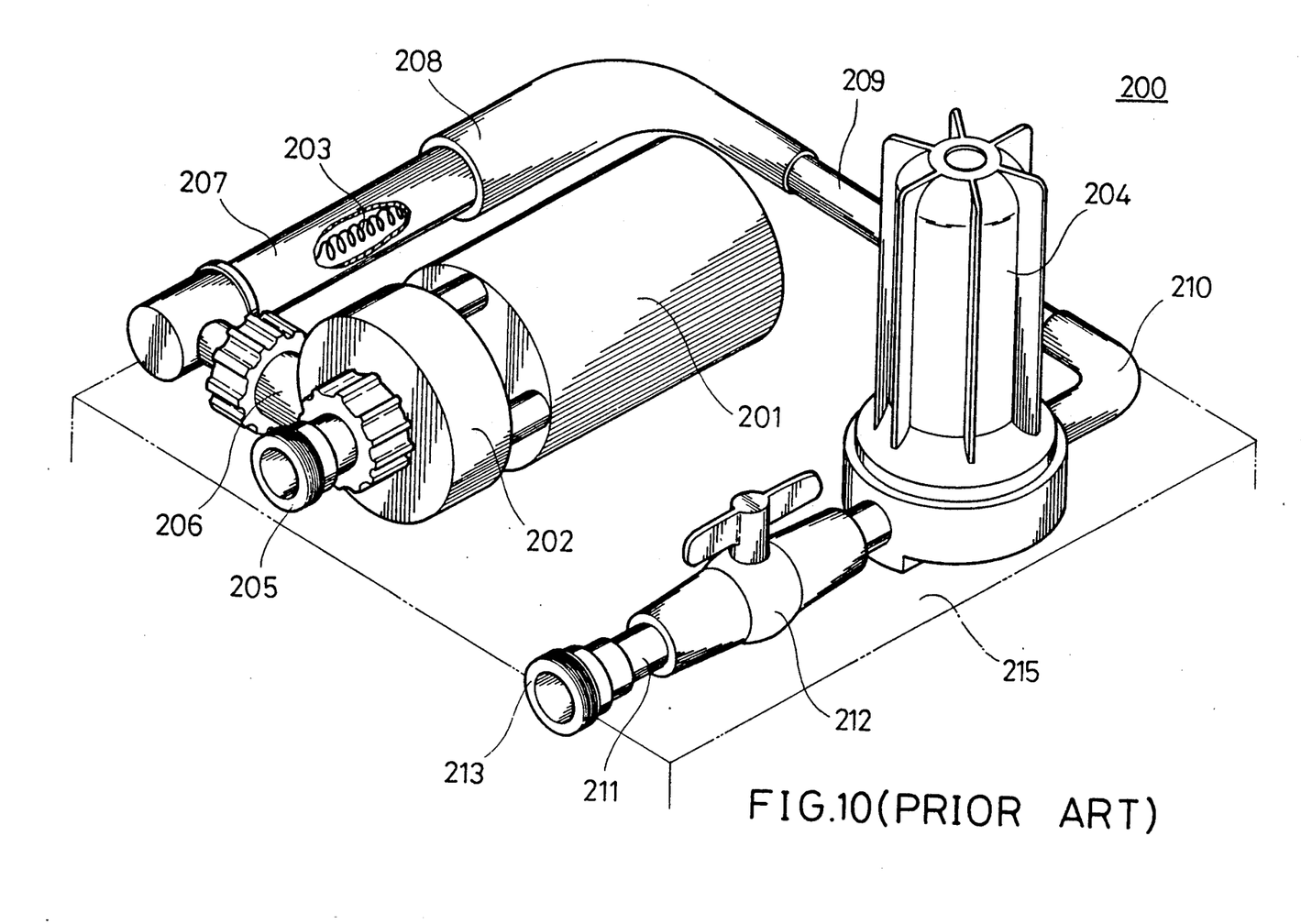
FIG. 10 is a schematic view of the first of the known auxiliary packages for sauna bath-pool.
Figure 11:
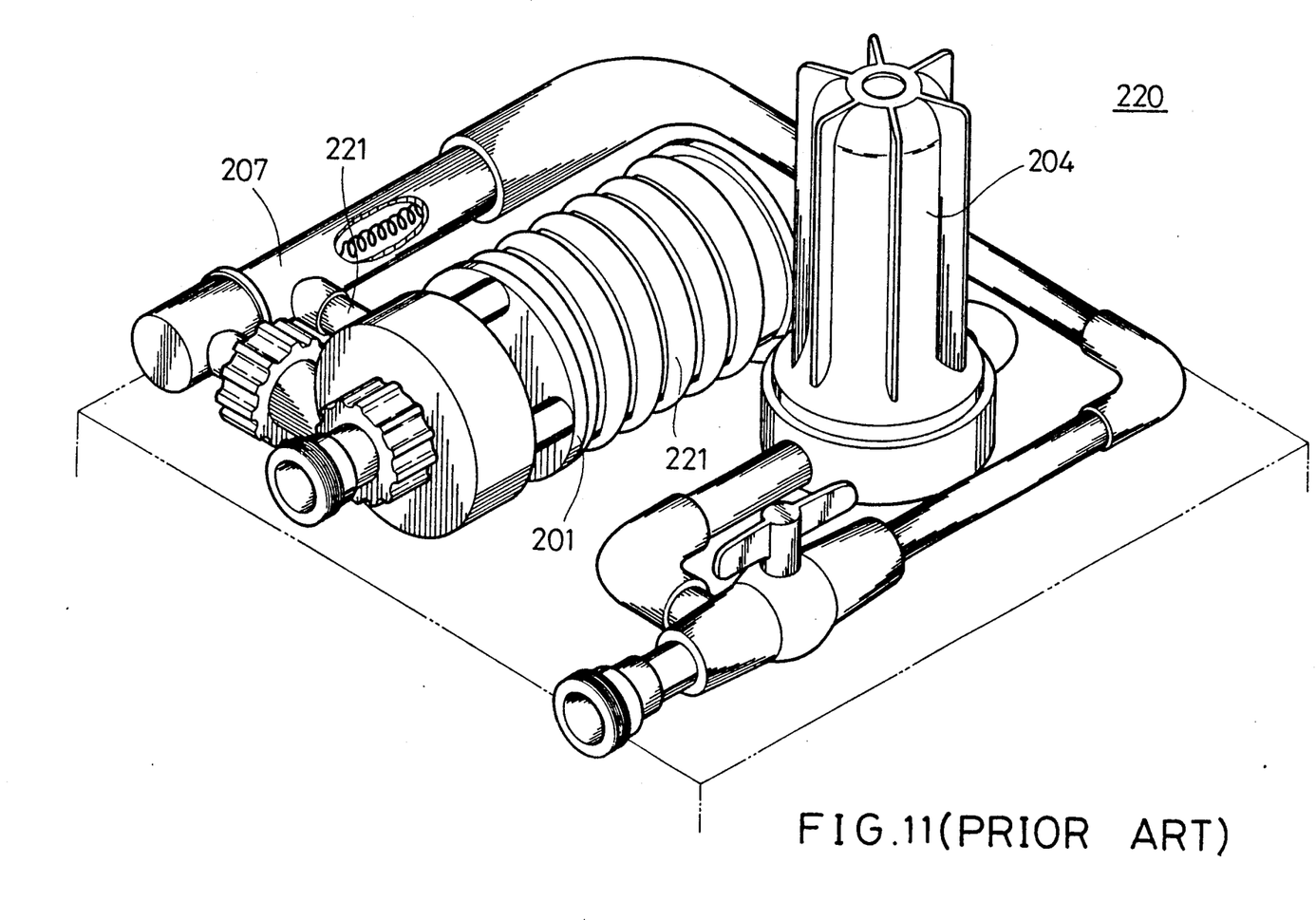
FIG. 11 is a schematic view of the second of the known auxiliary packages for sauna bath-pool.

As shown in FIGS. 10 and 11, there are two types of known auxiliary packages used for sauna bath-pools. As shown in FIG. 10, one of the known auxiliary packages 200 mainly comprises a motor 201, a water pump 202 driven by motor 201, a heating device 203, and a filter 204. All of these devices are mounted on a base 215 and are connected to each other by pipes 206, 207, 209, 211, elbows 208, 210 and valve 212. The water pump 202 comprises a water inlet 205, connected to the drain pipe (not shown) of a sauna bath-pool, which can suck the water from the sauna bath-pool. The water outlet 213 is used to return the water after it has been heated and filtered by heating device 203 and filter 204 respectively to the sauna bath-pool. The auxiliary package shown in FIG. 11 is substantially the same as that shown in FIG. 10 except that the filter 204 is connected parallel to the main pipe of the package and further includes a coil pipe 221 adjacently mounted around the outside of the motor 201 so that a portion of water from the sauna bath-pool can be returned to the sauna bath without being filtered while a portion of the water can be first filtered by filter 204, heated by passing through the coil pipe 221, and then returned to the pipe 207 so as to be preheated and filtered.

There is a common disadvantage to both of these two types of auxiliary packages as described above, namely, the pumps, the heating devices and filter devices must be connected by pipes and pipe fittings and must be supported on a base. Accordingly, the whole auxiliary package cannot be constructed in a compact way and therefore these known auxiliary packages for sauna bath-pool are not economical and convenient for use.

SUMMARY OF THE INVENTION

It is therefore an object of the present invention to provide an improved auxiliary package for a bath-pool which can be easily set up, and be constructed in a compact way.

To attain the above-mentioned object, the auxiliary package for bath-pool of the present invention comprises: a housing having a water inlet for receiving water from the bath-pool, a water outlet connected to the bath-pool and a plurality of partition walls for dividing the interior of the housing into a plurality of chambers and forming a water passage therein, a water pump mounted in one of the chambers for sucking the water from the inlet and circulating the water through the passage to the bath-pool, an electric motor mounted in one of the chambers for driving said water pump, which is capable of transfering the heat generated to the water flowing in the passage, a control box for controlling the activation of the electric motor, which is mounted watertight on the housing, a filter detachably mounted in one of the chambers housing, which is located in the downstream of the water passage to filter at least a portion of the water flowing in the water passage, heating means mounted in the water passage for heating the water flowing in the water passage, temperature adjusting means for adjusting the temperature of the water flowing in the water passage, and a temperature-limit switch to prevent the temperature of the water from exceeding a predetermined range.

In an alternate embodiment of the auxiliary package for bath-pool of the present invention, the electric motor comprises a body, a heat transfer sleeve mounted around the body of the motor and a heat exchanging plate mounted watertight between the body and the water passage and connected with at least a portion of the heat transfer sleeve so as to transfer the heat generated by the motor to the water through the heat transfer sleeve and heat exchanging plate.

In another embodiment of the auxiliary package for bath-pool of the present invention, the electric motor comprises a body, a set of pipes adjacently mounted around the body and connected upstream of the water passage so as to transfer the heat generated by said motor to the water.

In another embodiment of the auxiliary package for bath-pool of the present invention, the electric motor is a submersible motor submersed in the water passage so as to transfer the heat generated by the motor into the water.

BRIEF DESCRIPTION OF THE DRAWINGS

The present invention can be more fully understood by reference to the following detailed description and accompanying drawings, which form an integral part of this application.

DESCRIPTION OF THE PREFERRED EMBODIMENTS

Figure 1A:
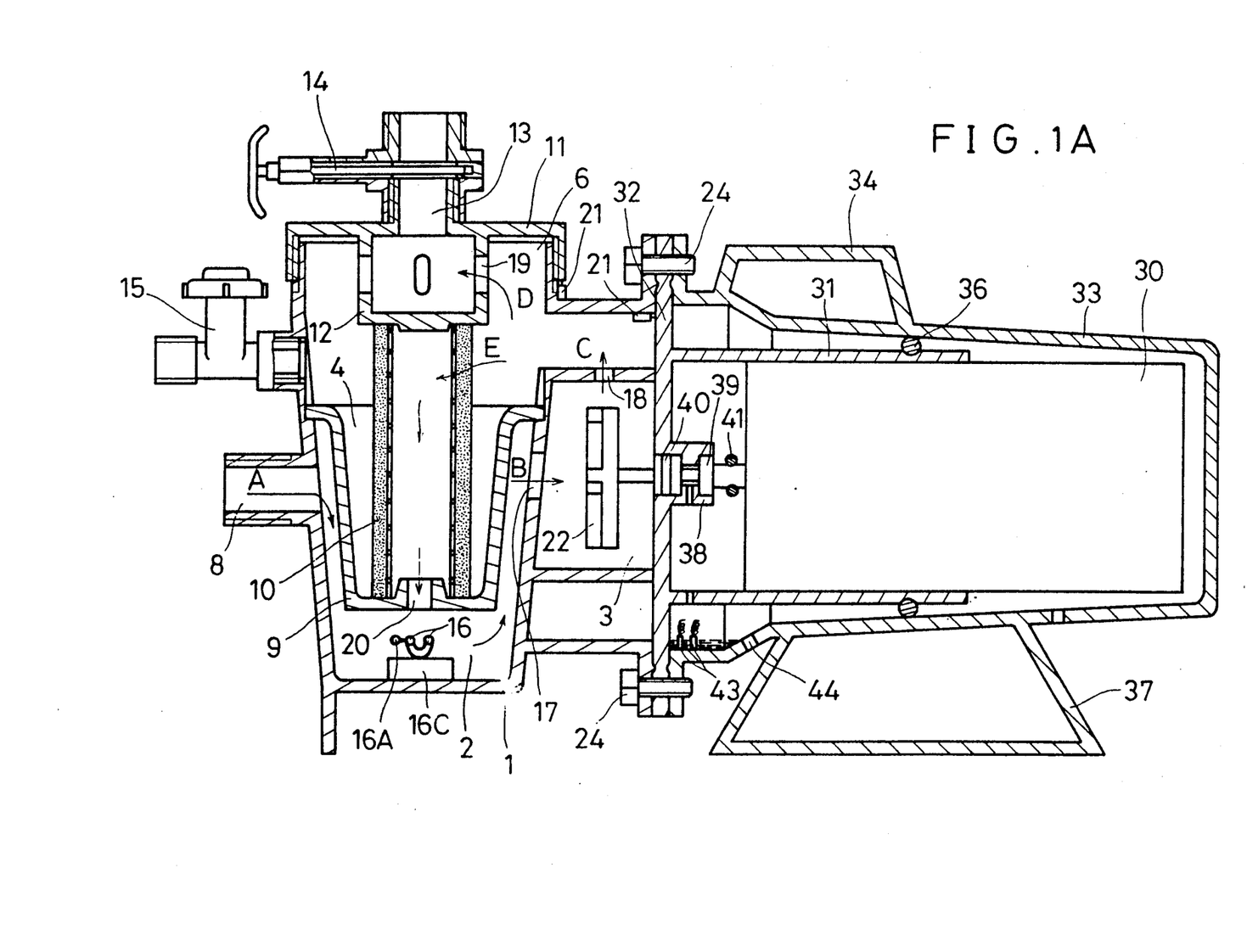
FIG. 1A is a longitudinal sectional view of the auxiliary package for a sauna bath-pool of a first embodiment of the present invention.
Figure 1B:
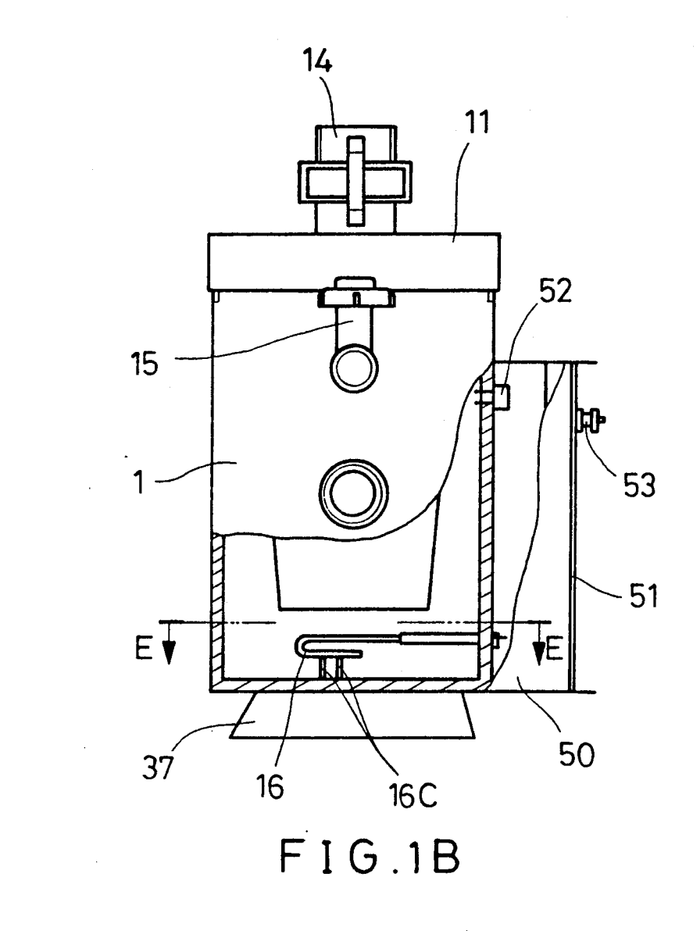
FIG. 1B is a side view, partly in section, of the auxiliary package for a sauna bath-pool as shown in FIG. 1A.
Figure 1C:
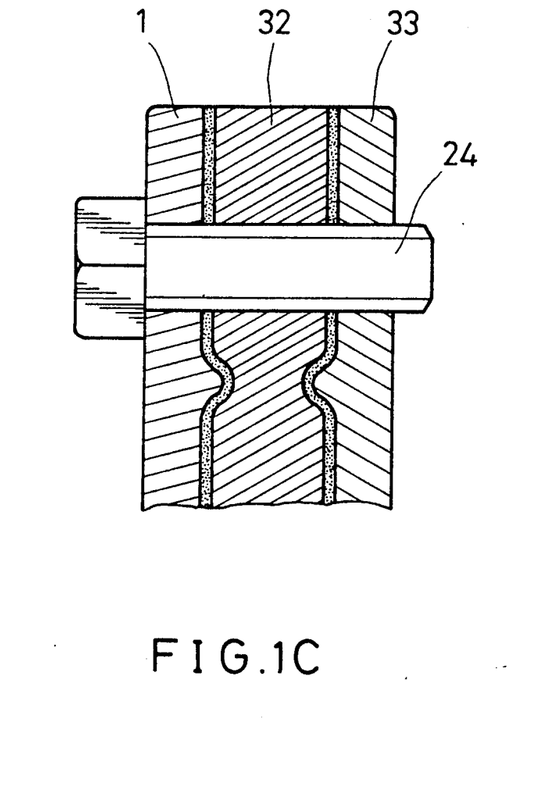
FIG. 1C is an enlarged view of a segment of FIG. 1A showing how the motor housing and the housing of the auxiliary package is connected in watertight manner.
Figure 1D:
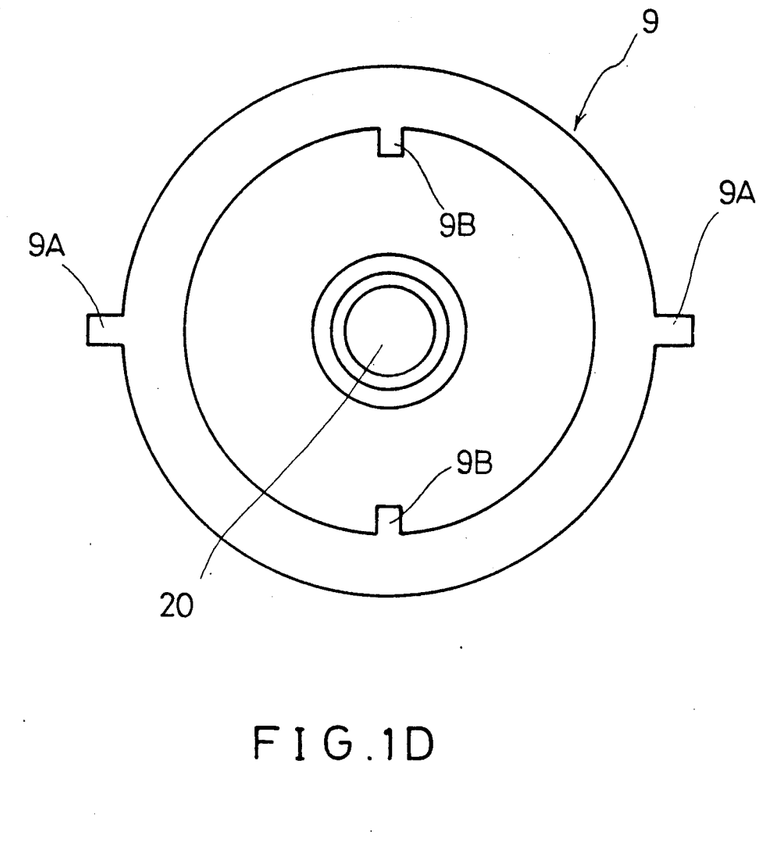
FIG. 1D is a enlarged top view of the supporting, fixing structure of the filter as shown in FIG. 1A.

The detailed structure of the first embodiment of the present invention will be hereinafter described based on FIGS. 1A, 1B, 1C, 1D, and 1E. The auxiliary package for a sauna bath-pool of this embodiment mainly comprises a housing 1, a filter support 9, a filter 10, an electrical heating device 16, a water pump 22, a filter cover 11, a motor 30, a heat transfer plate 32, a motor housing 33 and a control box 50. Housing 1 is integrally formed by injection molding of thermal plastic material. The filter support 9 is detachably supported in housing 1. As shown in FIG. 1D, two protrusions 9A are provided at the outer periphery of the support 9 for insertion into two corresponding concave portions (not shown) formed in the side wall of the housing 1 to receive support 9 in housing 1. Further, two handles 9B are provided on the inner side wall of support 9 to enable the user to easily remove or place the filter 10 into the filter support 9 by grasping the two handles 9B, 9B.

Figure 1E:
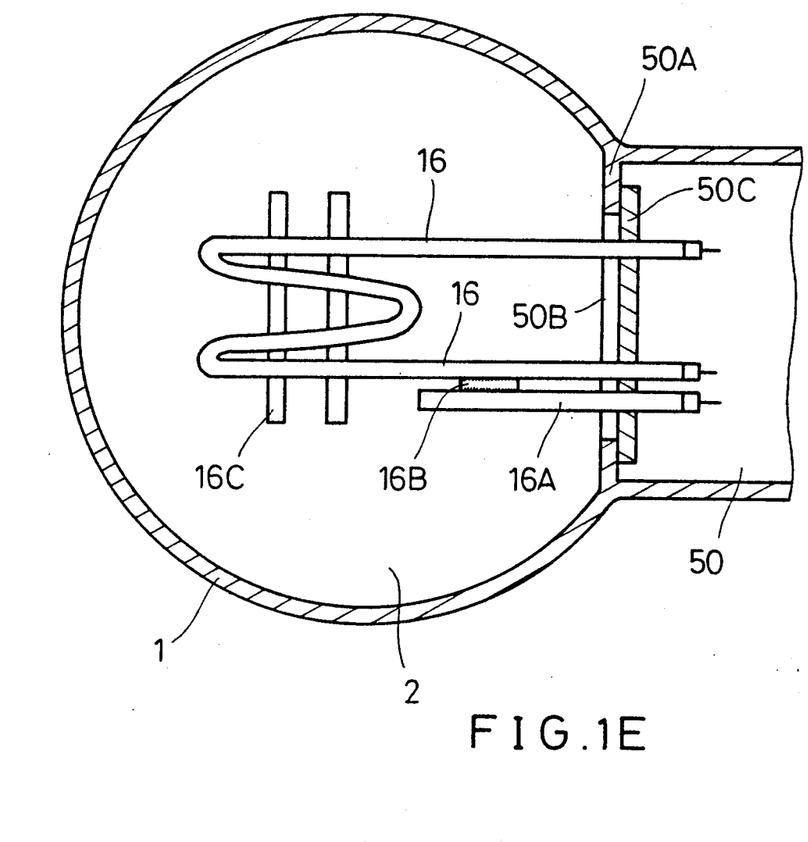
FIG. 1E is a sectional view, of the electrical heating device, taken along line E—E of FIG. 1B.

The interior of the housing 1 is divided into a heating chamber 2, a water pump chamber 3 and a filter chamber 4. In the side wall of the heating chamber 2 there is a water inlet 8, and in the heating chamber 2 itself, an electrical heating device 16 and a temperature detecting tube 16A also is provided. As shown in FIG. 1E, the control box 50 can be integrally formed with the housing 1 and divided therebetween by a partition wall. A portion of the temperature sensing tube 16A and the electrical heating device 16 is jointed together by a soldered portion 16B so as to directly and precisely sense the water temperature to prevent over heating. The electrical heating device 16 and the temperature sensing tube 16A are supported and fixed in housing 1 by frame 16C. Frame 16C is made of heat insulating material such as ceramics. The partition wall 50A is provided with an opening 50B through which the electrical heating device 16 and the temperature sensing tube 16A are passed. Furthermore, the control box 50 side of the partition wall 50A is also provided with a metal plate 50C which is mounted watertight on opening 50B to prevent passage of water. Metal plate 50C also functions as a support to fix the electrical heating device 16 and the heat sensing tube 16A, and also as a current collecting device for detecting ground faults. The water pump 22 is mounted in water pump chamber 3. The filter 10 is mounted in filter chamber 4 with its bottom supported on the filter seat 9. The top of the housing 1 is detachably closed by the filter cover 11, for example by screws. The central portion of the filter cover 11 is extended upward to form a tube-shaped water outlet 13, and extended downward to the top of the filter 4 to form a suppressing portion 12 to suppress the top of the filter 10 and fix the filter 10. The top of the water outlet 13 is connected to a check valve 14. The side wall of of filter chamber 4 is provided with a drain valve 15. To enable circulation of water from the sauna bath-pool, for heat transfer and parallel filtering (this type of filtering can reduce the load of the motor so as to enhance the life of the motor), at the partition walls of each chambers, the side wall of the suppress portion 12 and the bottom of the filter 9 are respectively provided with communicating openings 17, 18, 19 and 20. In this embodiment, the motor 30 for driving the water pump 22 is partitioned watertight by the heat transfer plate 32 from the water passage. In other words, motor 30 does not come into direct contact directly with the water. In order for the heat generated by the motor 30 to be transfered to the water, a heat transfer sleeve 31, which is integratedly formed with the heat transfer plate 32, is provided at the outer periphery of the motor 30. Both the heat transfer plate 31 and the heat transfer sleeve 32 are made of metal. A motor housing 33 is provided at the outside of the motor 30 for insulating heat, electricity and also for the protection of the motor 30. Heat transfer plate 32, motor housing 33 and housing 1 are fixed together by a fixing bolt 24. As shown in FIG. 1C, between the housing 1 and the heat transfer plate 32, as well as the heat transfer plate 32 and the motor housing 33 are respectively provided with a packing material so as to make them watertight. This packing material preferably is made of flexible material such as rubber. As shown in FIG. 1A, the outer periphery of the motor housing 33 is provided with a handle 34 so that it may be carried by the users. The bottom of motor housing 33 is provided with a base 37 to support the whole auxiliary package. In addition, some fastening means (not shown) are also provided at appropriate locations of housing 1 so as to fasten the whole auxiliary package to sauna bath-pools.

Figure 5:
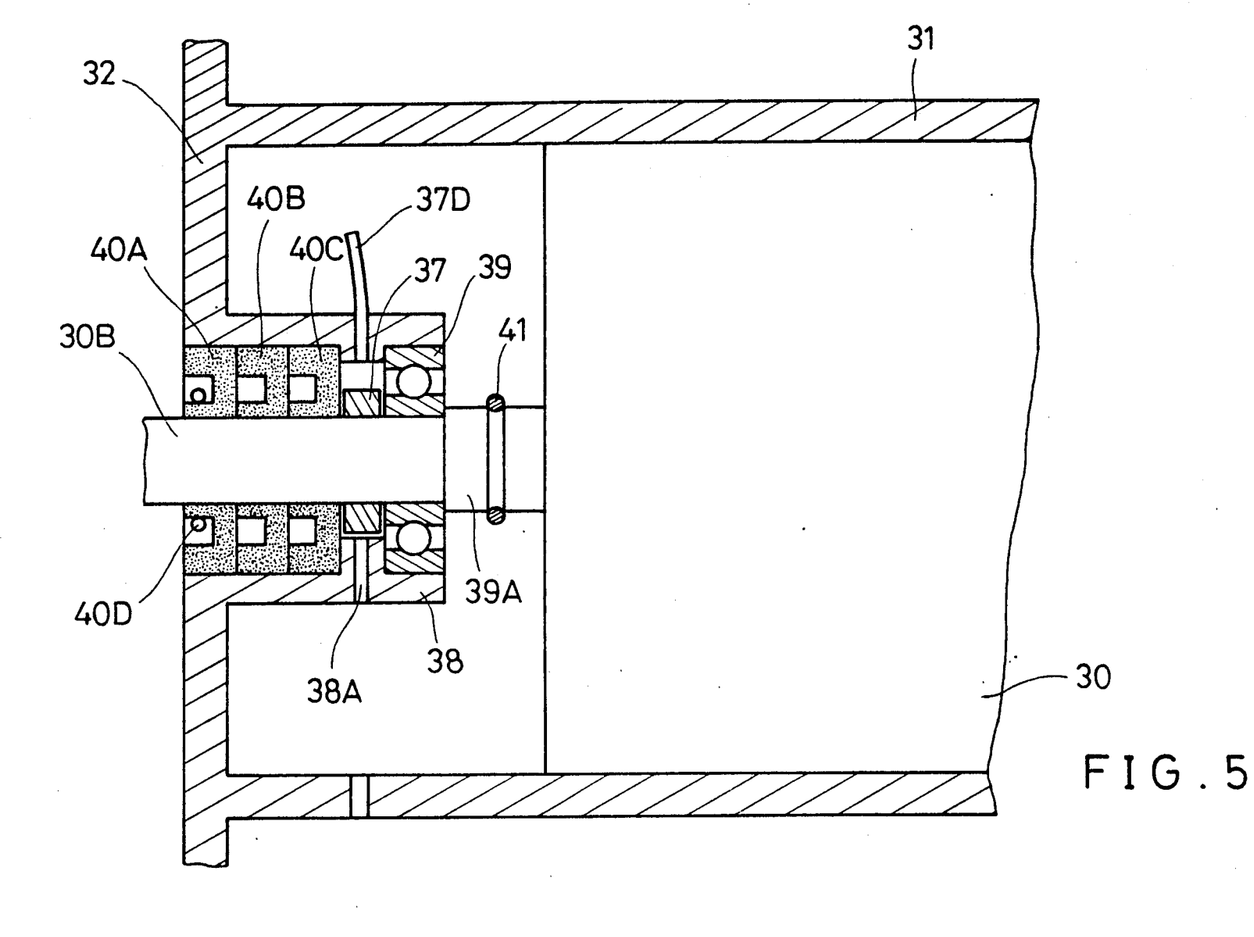
FIG. 5 is a sectional view of a segment showing the leakage prevention, air cooling and supporting mechanism of the motor of the auxiliary package for a sauna bath-pool of the present invention.
Figure 5A:
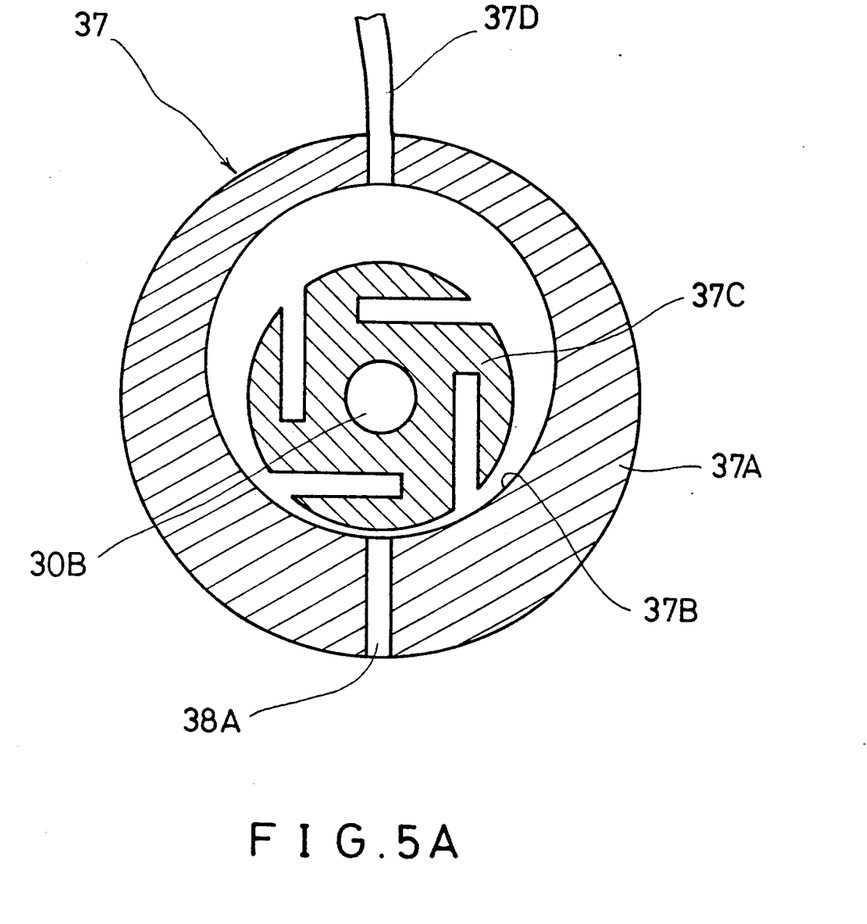
FIG. 5A is a sectional view of the air cooling means used in FIG. 5.

Referring to FIG. 5, motor shaft 30B is supported in the hub 38 which is located in the center of the heat transfer plate 32. To prevent the water flowing through the housing from permeating to the motor, between the central hole of the heat transfer plate 32 and the motor shaft 30B there are three sealing components 40A, 40B and 40C, which are preferably made of rubber material, to prevent the water from permeating from the left side of the heat transfer plate 32 to the right side. If desired, a spring 40D can be provided to press these water sealing components, for example 40A, to be retained tightly close to the motor shaft 30B and enforce the watertight effect. Between the bearing 39 and the sealing component 40C, an air cooling means 37 is provided for cooling the motor shaft 30B. The structure of this air cooling means 37 is shown in FIG. 5A. As shown in FIG. 5 and FIG. 5A, this air cooling means 37 comprises a cylindrical housing 37A having an eccentrical hole 37B therein, a rotor 37C mounted in the eccentrical hole 37B and on the motor shaft 30B, which is capable of rotating with the motor shaft 30B, an air tube 37D communicating the hole 37B to open air and a drain hole 38A. When the motor shaft 30B is rotated, air is sucked from the air tube 37D, compressed by the rotor 37C, and expelled out from the drain hole 38A so as to cool the motor shaft 30B. The drain hole 38A not only functions as a passage for the draining out of the cooling air but also functions as a passage for draining out of any small amount of water permeated into the water sealing components to prevent any water from permeating into the motor 30. Bearing 39 is water proof only on one side, namely, on the water pump 22 side. In addition, around the enlarged portion of the motor shaft 39A on the bearing 39 side, an O ring 41 is provided so that water permeated into the O ring 41 may be discharged out along the radial direction of the motor shaft 39A. As shown in FIG. 1A an O ring 36 is also provided between the motor housing 33 and the heat transfer sleeve 31 so as to prevent any water in the gap between the motor housing 33 and heat transfer sleeve 31A from permeating into the motor 30. Further, as shown in FIG. 1A, the motor housing 33 is designed to be in an inclined position so as to make the small amount of water that flows into the motor housing 33 to drain to the lower zone in the motor housing 33. The lower zone is also provided with a drain hole 44 and a leakage detecting device 43. The water leakage detecting device 43 is capable of switching off the power when water leakage is detected.

The control box 50 is provided with a pressure operated switch 52, temperature regulator 53, various power switches, various temperature limit switches and indicating lamps (not shown). The pressure operated switch 53 can automatically cut off the power of the electrical heating device 16 when the water pressure in the housing 1 is lower than an indicated value. The temperature limit switch can automatically cut off the power of the heating device 16 when the water temperature is higher than a predetermined level. The sealing cover 51 is provided watertight on the control box 50 and can be opened for maintenance.

For safety purpose, microswitches are provided at all the locations where open-and-shut devices are mounted, for example, at the sealing cover 51 of the control box, at the sealing cover 11 of the filter and at the heat transfer plate 32. In addition, each of the sockets (not shown) of the auxiliary package for bath pools is provided with a relay (not shown) and a control line is connected to each relay so as to automatically turn off the power of each socket when each of the above open-and-shut devices is opened. Furthermore, each relay is provided with a reset switch for resetting the electrical power.

Referring again to FIG. 1A, the flowing, heating and filtering of the water from the sauna bath-pool will be described. The water from the sauna bath-pool flows first into the heating chamber 2 along the arrow A and is heated by the electrical heating device 16, the water is then sucked into the water pump chamber 3 through communicating opening 17 along the arrow B direction and then is forced by the pump 3 to the filter 4 along the arrow C direction through 18. Meanwhile, a portion of the water is forced through the hollow suppressing portion 12 through the communicating opening 18 and the water outlet 13 to the sauna bath-pool along the arrow D direction. Another portion of the water is forced to flow through the filter material of filter 10 along the arrow E direction and is filtered: then it is forced to the heating chamber 2 through communicating opening 20 and is mixed with high velocity, low pressure water which comes from the water inlet 8 and flows into the heating chamber 2 along the arrow A direction, so that the filtered water is easily sucked into the water pump chamber 3. In this way, overload of the motor due to the filtering can be reduced but the suction momentum will not be decreased to influence the jet flow injected into the sauna bath-pool. Preferably, the communicating opening 20 between the filter 4 and the heating 2 is provided with an open-type spring check valve.

When it is desired to drain out the water in the sauna bath-pool for cleaning, the user can close the check valve 14 (as shown in FIG. 1A), open the drain valve 15 and connect a drainage pipe so as to continuously suck out the water in the sauna bath-pool and drain it out.

Figure 2:
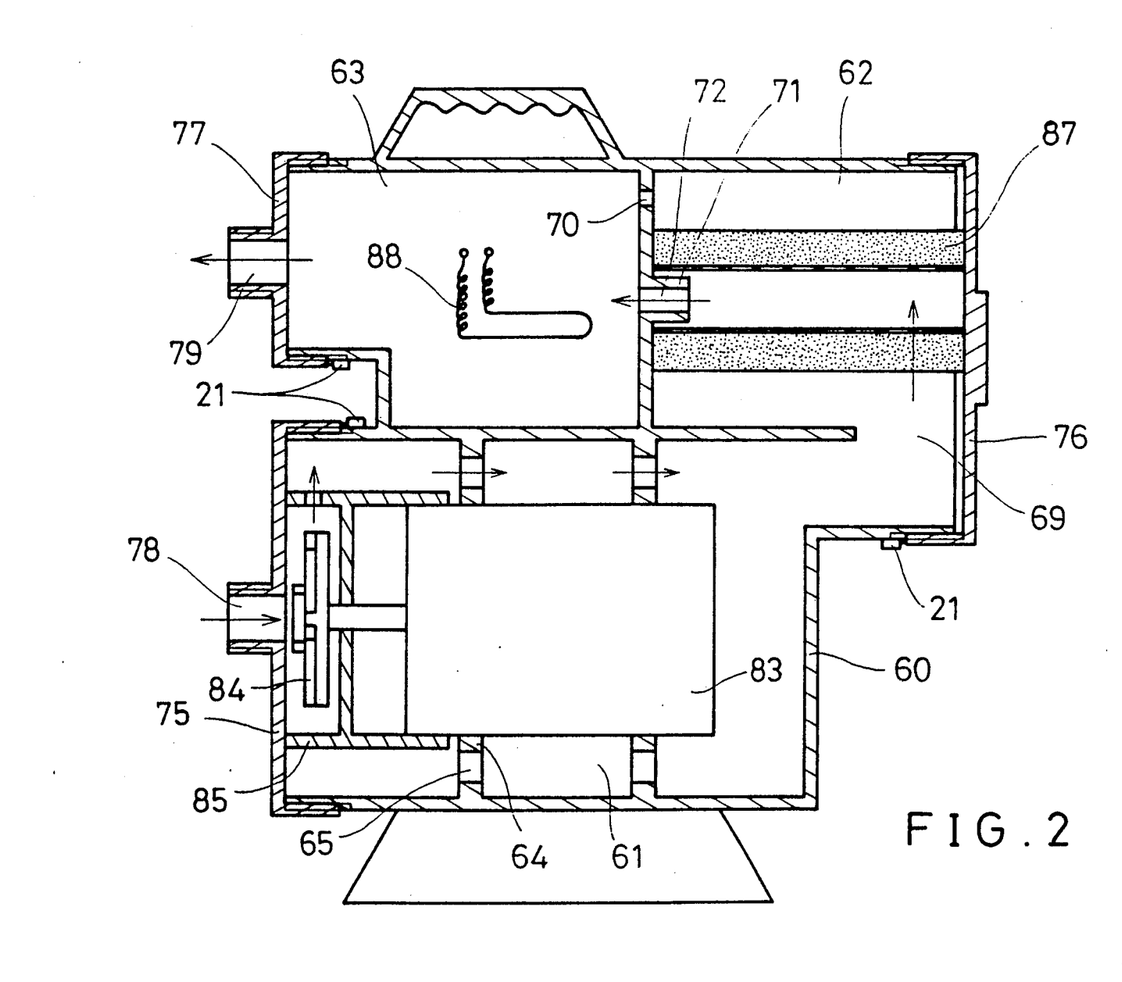
FIG. 2 is a longitudinal sectional view of the auxiliary package for a sauna bath-pool of a second embodiment of the present invention.

The structure and function of the second embodiment of the present invention will now be described by referring to FIG. 2. In this second embodiment, the difference of the structure from the first embodiment is that the motor is totally submersed into the water so that the heat generated by the motor can be directly used to heat the water. It is necessary in this embodiment to use a submersible motor. The integrally formed housing 60 is divided into a motor chamber 61, a filter chamber 62, a heating chamber 63, a motor 83, a water pump 84, a filter 87 and an electrical heating device 88 which are respectively provided within each chamber. A communicating opening 69 is provided between the motor chamber 61 and the filter chamber 62, and the filter chamber 62 and heating chamber 63 have communicating openings 70 and 72. Each opening of motor chamber 61, filter chamber 62 and heating chamber 63 is respectively provided with doors 75, 76 and 77 to close the openings in an openable and watertight manner. In addition, the same as that in the first embodiment, each of the doors are provided with microswitches 21. The purpose of these microswitches is the same as in the first embodiment. The doors 75 and 77 are provided with a water inlet 78 and a water outlet 79. The water is introduced into the motor chamber 63 from the water inlet 78 along the arrow direction, to perform direct heat exchange with the motor 83, the water is then introduced into the filter chamber 62 from communicating opening 69 where a portion of the water is directly introduced into the heating chamber 63 without being filtered and a portion of water first introduced into the filter chamber 87 where it is filtered and then is introduced into the heating chamber 63 from the communicating chamber 72. After the water is heated by the electrical heating device 88 in the heating chamber, it is introduced into the sauna bath-pool via the water outlet 79 to complete the circulation, filtering and heating of the water from the sauna bath-pool.

Figure 3:
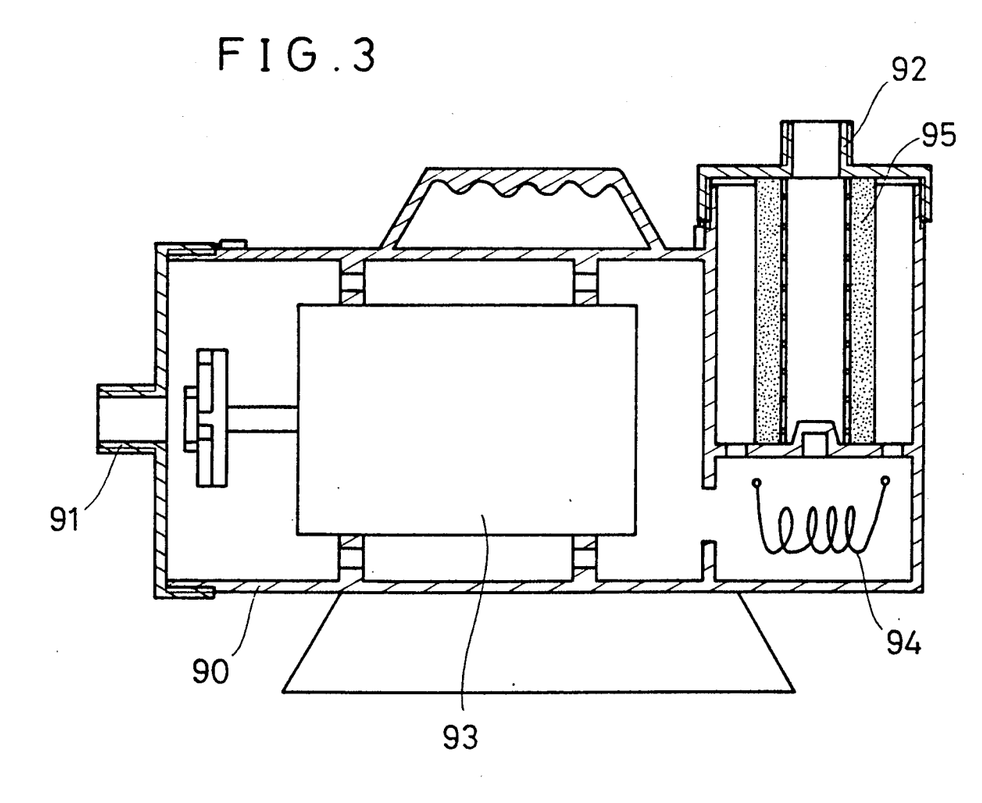
FIG. 3 is a longitudinal sectional view of the auxiliary package for a sauna bath-pool of a third embodiment of the present invention.

The structure and function of the third embodiment of the present invention as shown in FIG. 3 will now be described. The structure of the third embodiment is substantially the same as that of the second embodiment except that the water introduced into the housing 90 from the water inlet 91 is first subjected to direct heat transfer with the motor 93 submersed in the water passage. The water then is filtered by filter 95 and finally is introduced to the sauna bath-pool via water outlet 92 to complete the water circulation, heating and filtering of the water.

Figure 4:
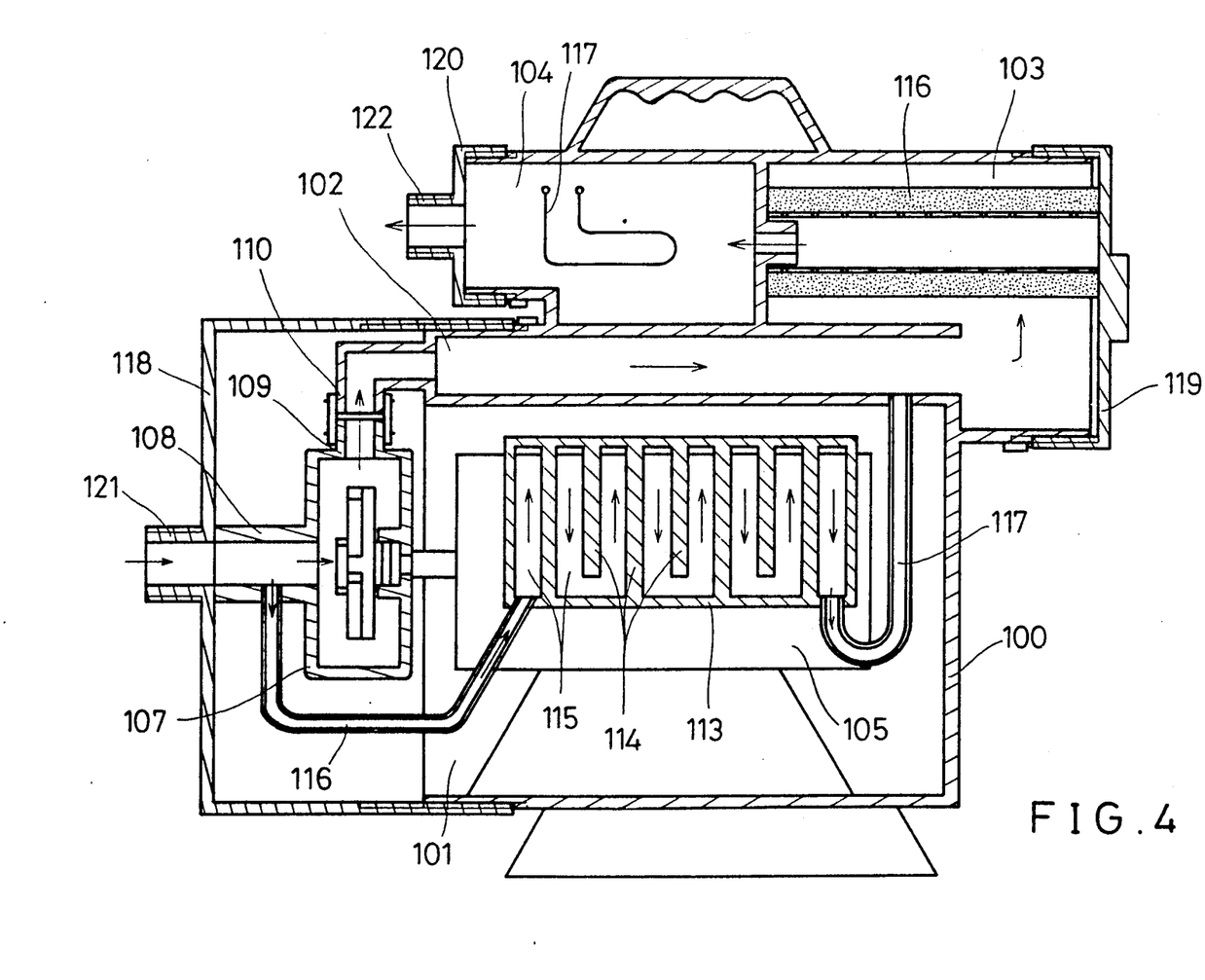
FIG. 4 is a longitudinal sectional view of the auxiliary package for a sauna bath-pool of a fourth embodiment of the present invention.

Next, the structure and function of the fourth embodiment of the present invention will be described. The structure of this embodiment is the same as the second embodiment except for the type of heat exchanging and filtering. In the second embodiment, all of the water is through the outer periphery of the motor and flows subjected to direct heat exchange, and only a portion of the water is subjected to filtering. However, in the fourth embodiment, only a portion of the water flows through the pipes mounted on the periphery of the motor and is subjected to heat exchange, the other portion of water is not subjected to heat exchange and is mixed with the portion of water heat exchanged later. All of the water used is first filtered and then is heated. As shown in FIG. 4, the housing 100 of the auxiliary package for bath-pools of this embodiment is integrally formed and is divided into a motor chamber 101, a passage chamber 102, a filter chamber 103, and a heating chamber 104. A motor 105 and a water pump 107 driven by the motor 105 are mounted in this motor chamber 101. The water pump 107 comprises a water inlet 108 and water exit 109. A conduit 110 is extended from the passage chamber 102. The conduit is connected watertight to the outlet 109 of the water pump 107. The heat exchange pipe 113 wound around the body of the motor 105 is formed by two long strips overlaped, and connected together with their two sides so that a water passage 115 is formed therebetween. These two strips are made of flexible and impermeable material. The inlet and outlet of the heat exchange pipe 113 are respectively connected to the inlet 108 of water pump 107 and passage chamber 102 by two connecting pipes 116', 117'. A filter 116 is mounted in the filter chamber 103 and an electrical heating device 117 is mounted in the heating chamber 104. In addition, at one end of the motor chamber 101, filter chamber 103 and heating chamber 104 may be opened and respectively closed with a sealing cover 118, 119 and 120. The sealing covers 118 and 120 are respectively mounted with a water inlet 121 and a water outlet 122 so as to communicate with the sauna bath-pool (not shown). The water inlet 121 is aligned with the inlet 108 of the water pump 107. When the auxiliary package of this embodiment is used, the water to be treated flows along the arrow direction in FIG. 4. That is, after the water is introduced into the inlet 108 of the water pump 107 through water exit 121, a portion of the water is directly sucked into the passage chamber 108 by the pump 107 without being subjected to heat exchange. Another portion of the water introduced to the heat exchange pipe 113 through connecting pipe 116, then is introduced around the outer periphery of the motor 105 via passage 115 along the arrow direction so as to be subjected to heat exchange. Finally, the water flows through connecting pipe 117 to meet with the water in the passage chamber 102. The heat exchange between the water and the motor is the same as that in the first embodiment as shown in FIG. 1A, which utilizes pressure difference to attain the effect of reduction of the load of the motor and utilizes this kind of heat exchange to cool the motor and preheat the water. Thereafter, the water is introduced into the filter 116 to be filtered and then is introduced to the electrical heating device 117 to be heated. The water, then is forced out from the water outlet 122 and returned to the sauna bath-pool to complete the circulation, partial heat exchange, filtering and heating.

FIGS. 6 to 9 show how the auxiliary package for bath-pool of the present invention is mounted or connected to the sauna bath-pool.

Figure 6:
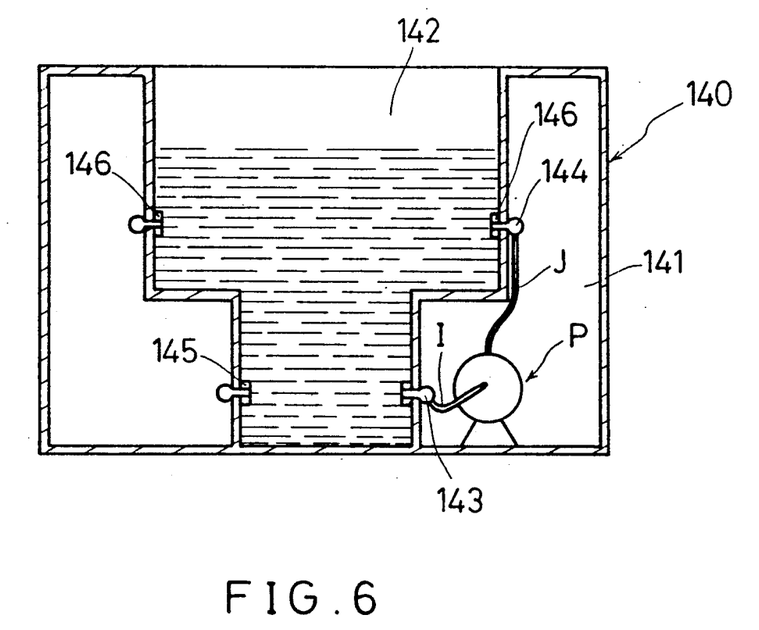
FIG. 6 is a schematic view showing a first embodiment of the auxiliary package of the present invention mounted to a sauna bath-pool.

In FIG. 6, the auxiliary package P of the present invention is mounted in the hollow side wall 141 of a sauna bath-pool 140. Its inlet pipe I and the outlet pipe J are respectively connected to the pipe 143 and pipe 144 mounted around the water tank 142. The water is sucked from a plurality of suction openings 145 which are connected to the pipe 143, and is jeted into the sauna bath-pool 140 from a plurality of nozzles 146 connected to the pipe 144.

Figure 7:
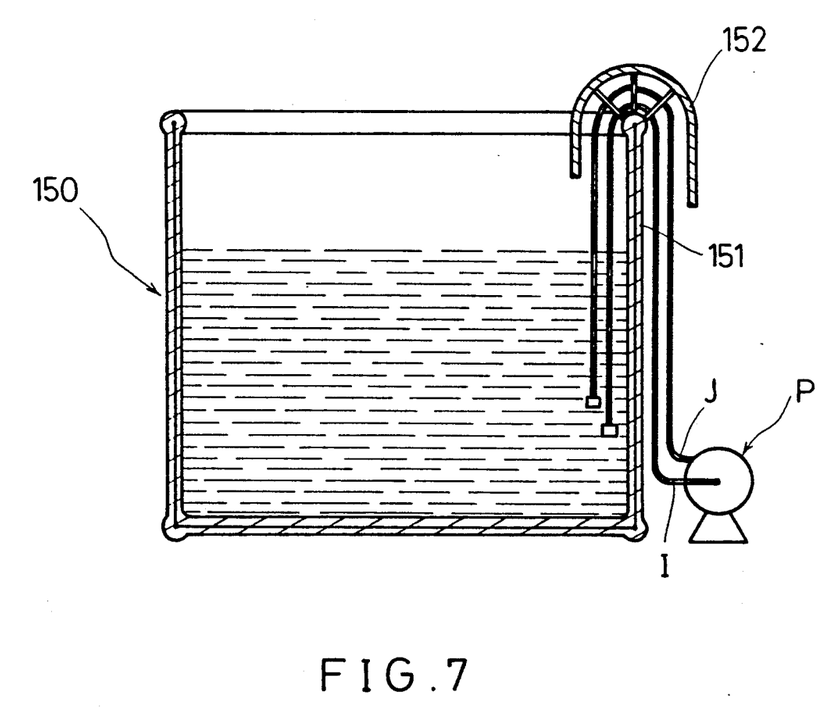
FIG. 7 is a schematic view showing a second embodiment of the auxiliary package of the present invention mounted to a sauna bath-pool.

In FIG. 7, the auxiliary package P of the present invention is mounted on the side walls of a sauna bath-pool 150. This sauna bath-pool comprises a wall body made of flexible, water-impermeable material and a bottom formed as a rigid frame. The water inlet I and water exit J are extended into the interior of the sauna bath-pool by mounting over the top of the side wall 151 of the sauna bath-pool and are fixed on the side wall by a dome-shaped clamp 152.

Figure 8:
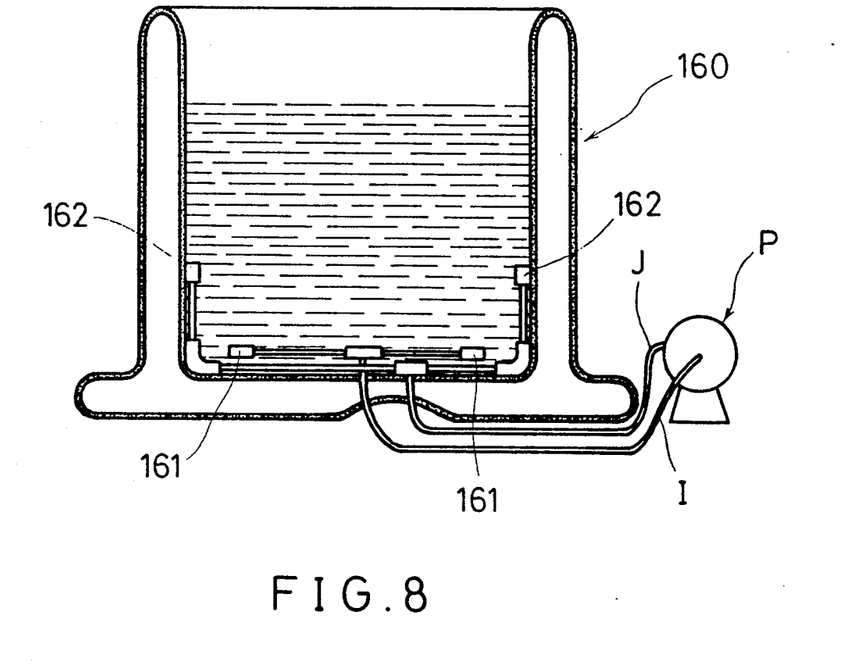
FIG. 8 is a schematic view showing a third embodiment of the auxiliary package of the present invention mounted to a sauna bath-pool.

In FIG. 8, the auxiliary package P of the present invention is mounted on the side wall of the sauna bath-pool. The inlet pipe I and outlet pipe J are connected into the bottom of the sauna bath-pool 160. The water is sucked by a plurality of suction openings 161 and is injected back to the sauna bath-pool by a plurality of nozzles 162.

Figure 9:
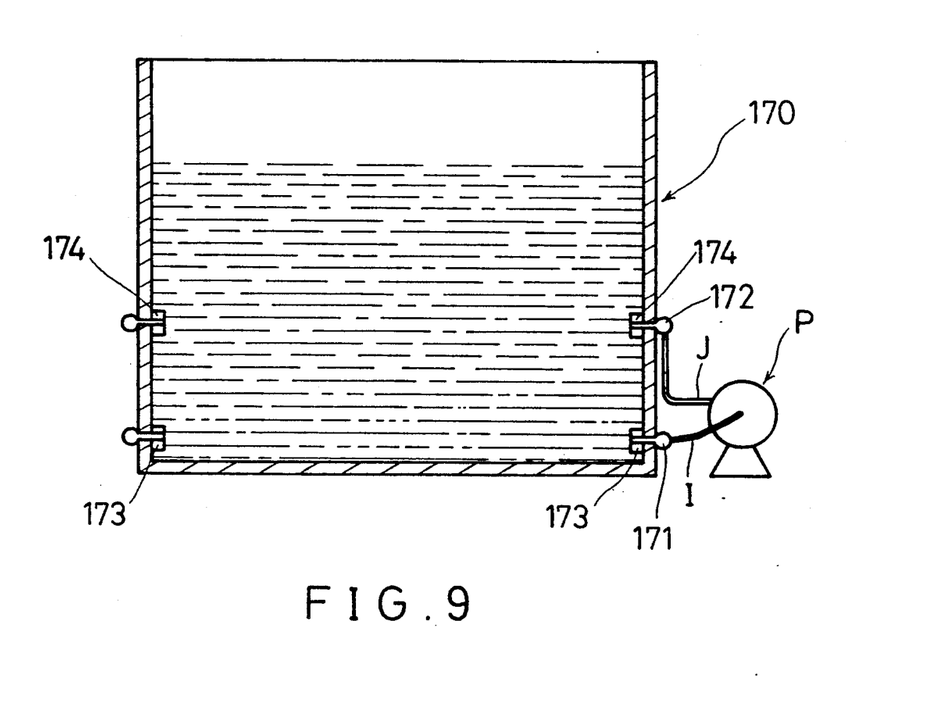
FIG. 9 is a schematic view showing a fourth embodiment of the auxiliary package of the present invention mounted to a sauna bath-pool.

In FIG. 9, the auxiliary package P of the present invention is mounted on the side wall of a sauna bath-pool made of rigid material. The inlet pipe I and outlet pipe J are respectively connected with the pipe 171 and pipe 172 mounted around the side wall of the sauna bath-pool. The water is sucked by a plurality of suction openings 173 and are injected to the sauna bath-pool by a plurality of nozzles 174.

In all of the mounting types of the auxiliary package of the present invention, the nozzles can be designed to be capable of injecting the water together with air so as to attain a massaging effect. Since the structure of the nozzles is outside the scope of the present invention, its detailed structure is not described.

In accordance with the present invention, instead of utilizing pipes, fittings, and elbows to connect the water pump, electrical heating device and filter, an integral formed housing is used to receive all the components therein. Therefore, it is not necessary to use a base so that the package of the present invention can be made in a compact form. In addition, by using the heat generated by the motor to heat the water, the energy can be greatly saved and the life of the motor used can be lengthened. Furthermore, as all of the sealing covers of the water pump, electrical heating device and filter are provided with a microswitch and all of the power sockets are provided with a breaker, when the sealing covers are opened or when an electricity leakage occurs, the power can be automatically switched off. In addition, between the motor and water pump a water proof mechanism is provided so that electricity leakages can be completely prevented.

While the invention has been described in terms of several preferred embodiments, it is to be understood that the invention need not be limited to the disclosed embodiments. On the contrary, it is intended to cover various modifications and similar arrangements included within the spirit and scope of the appended claims.

What is claim is:

1. An auxiliary package for a bath-pool for circulating and treating water from said bath-pool, comprising:
   a housing having a water inlet for receiving the water from said bath-pool, a water exit for sending the water back to said bath-pool and a plurality of partition walls for dividing the interior of said housing into a plurality of chambers and forming a water passage therein;
   a water pump mounted in one of said chambers for sucking the water from said inlet and circulating the water through said passage to said bath-pool;
   an electric motor for driving said water pump, said motor being capable of heat exchange with the water flowing in said passage;
   a control box for controlling said electric motor, said control box being mounted water tight on said housing;
   electric plug means connected to a power supply for receiving electrical power required for said auxiliary package;

heating means mounted in said water passage for heating the water flowing in said water passage, said heating means comprising a heating tube and a heating wire received in said heating tube;

temperature adjusting means for adjusting the temperature of the water flowing in said water passage;

a temperature limit switch for restricting the temperature of the water under a predetermined limit temperature, said temperature limit switch including a temperature sensing tube, one section of said temperature sensing tube being welded to said electrical heating device for directly sensing the temperature;

a metal plate disposed on a common wall between said housing and said control box, wherein one side of the metal plate is in direct contact with said water, said temperature sensing tube and heating tube are inserted water tight through and fixed on said metal plate and are supported on said housing by heat insulting material, and said metal plate functions as an electricity collector for detecting ground fault.

2. An auxiliary package for a bath-pool as claimed in claim 1, wherein said electric motor comprises a body, a set of pipes adjacently mounted around said body and connected to said water passage so as to transfer the heat generated by said motor to the water.

3. An auxiliary package for a bath-pool as claimed in claim 1, wherein said electric motor is a submersible motor submersed in said water passage so as to transfer the heat generated by said motor to the water.

4. An auxiliary package for a bath-pool as claimed in claim 1, further comprising: a filter detachably mounted in one of said chambers in said housing, which is located downstream of said water pump to filter all of the water flowing in said water passage.

5. An auxiliary package for a bath-pool for circulating and treating water from said bath-pool, comprising:

a housing having a water inlet for receiving the water from said bath-pool, a water exit for sending the water back to said bath-pool and a plurality of partition walls for dividing the interior of said housing into a plurality of chambers and forming a water passage therein;

a water pump mounted in one of said chambers for sucking the water from said inlet and circulating the water through said passage to said bath-pool;

an electric motor for driving said water pump, said motor being capable of heat exchange with the water flowing in said passage;

a control box for controlling said electric motor, said control box being mounted water tight on said housing;

electric plug means connected to a power supply for receiving electrical power required for said auxiliary package; and a filter detachably mounted in one of said chambers in said housing, which is located downstream of said water pump to filter only a portion of the water flowing in said water passage.

6. An auxiliary package for a bath-pool as claimed in claim 5, wherein said electric motor comprises a body, a heat transfer sleeve mounted around said body of said motor and a heat exchange plate mounted water tight between said body and said water passage and connected to at least a portion of said heat transfer sleeve so as to transfer the heat generated by said motor to the water through said heat transfer sleeve and said heat exchange plate.

7. An auxiliary package for a bath-pool as claimed in claim 5, further comprising a handle provided on the housing for carrying by the user.

8. An auxiliary package for a bath-pool as claimed in claim 5, further comprising a fixing means for fixing said housing to a bath-pool.

9. An auxiliary package for a bath-pool as claimed in claim 5, further comprising a check valve provided downstream of said water exit and a drain valve provided on the upstream of said water exit so that the water in said bath-pool can be drained by closing said check valve and opening said drain valve.

10. An auxiliary package for a bath-pool as claimed in claim 5, further comprising an over temperature power breaker to automatically turn off the power supply of said motor so as to prevent said motor from overheating when the temperature of said motor is over a predetermined value.

11. An auxiliary package for a bath pool as claimed in claim 5, further comprising at least one water and air nozzle mounted in a side wall of said bath-pool and connected to said water exit of said package, said nozzle being capable of injecting into the bath-pool a mixing flow of water and air.

12. An auxiliary package for a bath-pool as claimed in claim 5, which is received in a hollow side wall of said bath-pool, and in which said water inlet and water exit communicate with the interior of said bath-pool by water pipes passing through said side wall of said bath-pool.

13. An auxiliary package for a bath-pool as claimed in claim 5, which is mounted beside the bath-pool and in which said water inlet and said water exit communicates with the interior of a bath-pool by water pipes mounted over the top portion of a side wall of said bath-pool.

14. An auxiliary package for a bath-pool as claimed in claim 5, which is mounted beside the bath-pool and in which said water inlet and water exit communicates with a interior of the bath-pool by water pipes passing through the bottom of said bath-pool and extending their open ends into the water in said bath-pool.

15. An auxiliary package for a bath-pool as claimed in claim 5, which is mounted beside the bath-pool and in which said water inlet and water exit communicates with the interior of a bath-pool by water pipes passing through the side wall of said bath-pool and extending their open end into the water in said bath-pool.

16. An auxiliary package for a bath-pool for circulating and treating water from said bath-pool, comprising:

a housing having a water inlet for receiving the water from said bath-pool, a water exit for sending the water back to said bath-pool and a plurality of partition walls for dividing the interior of said housing into a plurality of chambers and forming a water passage therein;

a water pump mounted in one of said chambers for sucking the water from said inlet and circulating the water through said passage to said bath-pool;

an electric motor for driving said water pump, said motor being capable of heat exchange with the water flowing in said passage;

a control box for controlling said electric motor, said control box being mounted water tight on said housing;

electric plug means connected to a power supply for receiving electrical power required for said auxiliary package;

a heat exchange plate disposed on a common wall between said housing and said control box, one side of said heat exchange plate being in direct contact with said water;

said heat exchange plate including a motor shaft support within which is provided a bearing for supporting the shaft of said motor, said motor shaft support being provided therein a water drain hole positioned between said bearing and said water passage and extending radially downward from the outer periphery of said motor shaft through said support for draining water;

said housing including a water collection lower zone directly under said water drain hole; and said auxiliary package including water leakage detecting means within said lower zone which may detect water leakage and break the power of said package when water is accumulated in said lower zone.

17. An auxiliary package for a bath-pool as claimed in claim 16 further comprising:

air cooling means including a cylindrical case having an eccentrical hole formed therein;

a rotor mounted in said eccentrical hole and fixed to said motor shaft, capable of rotating with said motor shaft; and an air tube communicating said eccentrical hole to open air so as to suck the air through said air tube into said eccentrical hole and expel the air from said drain hole to cool said motor shaft.

18. An auxiliary package for a bath-pool as claimed in claim 5 further comprising:

said water pump having a sealing cover and a first microswitch adapted to be opened upon movement of said cover;

said control box having a sealing cover and a second microswitch adapted to be opened upon movement of said cover;

said filter having a sealing cover and a third microswitch adapted to be opened upon movement of said cover;

said electric plug means including a relay controlled by said microswitches and adapted to cut off said power supply when any of said sealing covers is opened; and a reset switch connected to said microswitches and adapted to reconnect said power supply when the opened sealing cover is closed again.

19. An auxiliary package for a bath-pool as claimed in claim 16, wherein said bearing is a one side waterproof bearing which is waterproof only on the side near said passage.

* * * * *